Dec. 17, 1968  D. M. JENKS  3,416,582
REDUCTION DRIVER
Filed Oct. 10, 1966
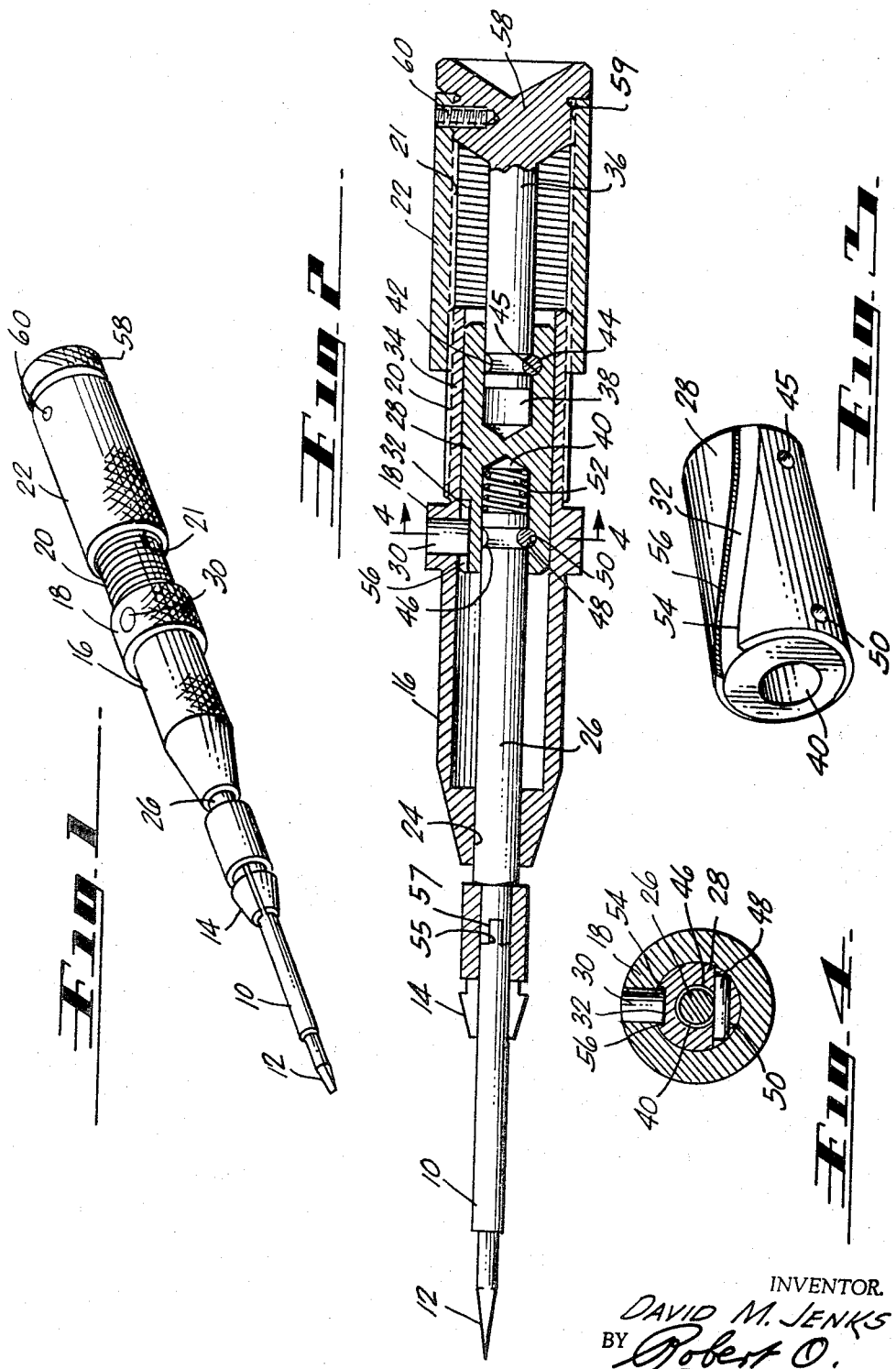
INVENTOR.
DAVID M. JENKS
BY Robert O. Richardson
ATTORNEY.

United States Patent Office 3,416,582
Patented Dec. 17, 1968

3,416,582
REDUCTION DRIVER
David M. Jenks, Canoga Park, Calif., assignor, by mesne assignments, to McDonnell Douglas Corporation, Santa Monica, Calif., a corporation of Maryland
Filed Oct. 10, 1966, Ser. No. 585,550
6 Claims. (Cl. 145—50)

ABSTRACT OF THE DISCLOSURE

A shaft rotation rate reduction mechanism for rotating a nut, bolt or screwdriver shaft with high angular accuracy. By rotating an actuating knob, a reduction barrel is moved longitudinally with a slight rotation twist which is followed by the shaft.

---

While rotational driving mechanisms for use in connection with various rotatable devices such as nuts, bolts, screws, shafts, and the like, are well known, there has existed a substantial need for a simple, reliable, and efficient manually operated driving device in which a positive reduction in a rotational rate may be accomplished. The operation of such a rotation rate reducing mechanism must necessarily, in most precision applications, be positive and smooth, and substantially free from backlash, thereby to enable the driving of rotatable elements in either direction or adjustment of shaft positions. Further, it is often necessary that a relatively high torque be applied to an element to be rotated without the necessity for imparting substantial work to produce such torque.

As an example of appropriate use of rotation rate reducing mechanisms, they may be employed in a screwdriver structure which finds particular use in the field of electronics, where it is often necessary to alter or adjust components of electronic circuits such as potentiometers, variable capacitors, tuned coils, and the like by rotating a shaft, screw or the like. These adjustments are required and serve to vary operating characteristics of the electronic circuits in which they are used, whereby to vary voltage potentials, coupling characteristics, and oscillator tuning, for examples. Such components and circuits are commonly found in electronic equipment such as radio and television receivers and transmitters, missile and space vehicle electronic devices, computers, radar apparatus, power supplies, and in many other kinds of equipment in which electronic circuits are employed.

In such equipment, just mentioned, it is often necessary that movement of adjusting elements be through an angle of but a fraction of a degree, with such a small amount of movement being extremely difficult, if not impossible, from a practical standpoint through utilization of one-to-one ratio drivers such as alignment tools, screwdrivers, or nut and bolt turning devices. While devices of this general nature, which are capable of making minute rotational adjustments, have been known before, they have commonly employed elaborate and fairly complex gear train mechanisms which inherently include undesirable backlash. As rotation of certain adjusting elements in electronic equipment must be in either direction, it is desirable that the amount of movement be positive in either direction, that there be a minimum or substantially no backlash, and that the user be able to feel the movement. Further, with prior mechanisms, the complexity of gear trains when employed in a tool of relatively small size necessitates small and delicate mechanical components and precludes application of a substantial amount of torque to the item being adjusted. Still further, the necessary fine tolerances which must be adhered to in the manufacture of gear train structures greaty increases the cost of manufacturing precision tools of this type.

The shaft rotation reduction mechanism comprising the present invention, when used in a reduction screwdriver, includes a screwdriver shaft affixed to a reduction barrel. The reduction barrel is rotatably and longitudinally movable within a body having a holding handle, to which a rotatable handle is threadedly mounted. As the rotatable handle is rotated, it moves along the axis of the holding handle, causing the longitudinal movement of the reduction barrel. This movement imparts a small angular rotation of the barrel, and hence to the screwdriver shaft. A large movement of the rotatable handle produces a small movement of the shaft, thus allowing the extremely fine adjustments that have been otherwise impossible. As an additional feature, a slip clutch spring is provided to permit rotation of the reduction barrel without rotation of the shaft when excessive torsion resistance from a screw head prevents its rotation. Also, a chuck may be mounted on the shaft to accommodate interchangeable tips.

In one embodiment of a reduction screwdriver utilizing the present invention, the reduction barrel has a spiral lead groove having a twist of one revolution per two inches in barrel length. A guide pin protruding inwardly from the outer body, which is held non-rotatable by the user, engages the spiral groove whereby longitudinal movement of the reduction barrel within the body also imparts a rotation to the reduction barrel. This rotation is thus imparted to the driver shaft. It also moves the drive shaft longitudinally but this movement is not utilized. The rotatable handle is threadedly mounted on the body and has an inner shaft engageable with the reduction barrel to cause its longitudinal movement upon rotation of the rotatable handle. The number of threads per inch in the threaded engagement of the rotatable handle to the body, and the degree of spiral of the spiral groove in the reduction barrel, determines the degree of reduction of the screwdriver. In one embodiment, a reduction of 80 to 1 is obtained, i.e., for every 80 revolutions of the handle the screwdriver blade makes one rotation.

It is accordingly an object of the present invention to provide for a novel shaft rotation rate reduction mechanism.

Another object of the invention is the provision of a shaft rotation rate reduction mechanism that converts a handle rotational movement to longitudinal movement of a reduction barrel with a rotational movement at a reduced rate.

Another object is the provision of a new reduction screwdriver adapted specifically and useful in fine adjustment of electronic components and the like.

Another object is the provision of a new reduction screwdriver having a shaft rotation reduction mechanism within a non-rotating body portion, actuated by a rotatable handle at one end to impart shaft rotation of a lesser degree at the other end.

Another object is the provision of a shaft rotation rate reduction mechanism in which a driving shaft imparts rotation at a reduced rate to a driven shaft without backlash.

Another object is the provision of a shaft rotation rate reduction mechanism which develops high torque on the driven shaft yet provides "feel" to the user on the driving shaft.

Another object is the provision of a reduction screwdriver that is inexpensive to manufacture, durable in use, easy to maintain, and simple and accurate in its use.

Other objects will become more readily apparent as a description of this invention proceeds, now having reference to the drawing wherein:

FIG. 1 is a perspective view of a reduction screwdriver embodying the features of this invention;

FIG. 2 is an enlarged longitudinal sectional view depicting the internal construction of the screwdriver;

FIG. 3 is a detail perspective view showing the reduction barrel; and

FIG. 4 is a transverse sectional view taken substantially along line 4—4, FIG. 2.

Referring now to the screwdriver shown in FIG. 1, there is shown a screwdriver shaft 10 with a non-electrically conductive and non-magnetic tip 12. This screwdriver shaft 10 is mounted in a chuck 14 which is positioned on the end of shaft 26 extending from cylindrical body 16. Body 16 has an enlarged knurled portion 18 which may serve as a conventional screwdriver handle when a one-to-one rotation of the screwdriver shaft 10 is desired. On the other side of this handle portion 18, the cylindrical body 16 has male threads 20 on its outer surface. Mating with these threads are the internal threads 21 on the inner surface of a cylindrical reduction handle 22.

For a fast response to handle rotation, a one-to-one reduction is desirable. This is achieved simply by rotating handle 18, and shaft 10 rotates at the same rate. This may be done until a screw has been inserted to approximately the proper distance. As applied to the tuning of a circuit, this would be considered as coarse tuning. For fine tuning, in which a very small rotational adjustment is desired, the handle 18 is held non-rotatable and reduction handle 22 is rotated. As it rotates, the mating of threads 20 and 21 cause the handle 22 to move slowly in a longitudinal direction on body 16. Depending upon the pitch of the threads (and also the lead of the spiral groove, more fully explained in connection with FIG. 3) the tip 12 will rotate once for every predetermined number of revolutions in the reduction handle. Typically, this may be 80 to 1 or 40 to 1 or 20 to 1, although in a manner hereinafter more fully described, such a reduction in rate of rotation may be made at any ratio desired.

As can be seen in FIG. 2, the cylindrical body 16 has an opening 24 at one end through which shaft 26 is rotatably mounted and longitudinally movable. Body 16 is hollow to permit longitudinal movement of parts internally mounted therein. Body 16 has an enlarged outer knurled circumference portion or handle 18 which may be held by the operator in non-rotatable position to affect the reduction in rate of rotation of shaft 26. Handle 18 also may be rotated to affect a one-to-one ratio with the shaft 26. A guide pin 30 extends down from handle 18 into the hollow portion of the body 16 for engagement within the spiral lead groove 32 of barrel 28. Body 16 has male threads on end 34 which is opposite to that of opening 24. It is within the hollow portion of body 16 that the longitudinal movement of drive shaft, or plunger, 36 causes rotation of shaft 26 through the reduction barrel 28 connected therebetween.

The reduction barrel 28 is a cylindrical member having a bore 38 extending axially through one face thereof and a bore 40 extending axially through the other face. Extending into bore 38 is one end of the drive shaft or plunger 36, which is adapted for rotational movement relative thereto. This is accomplished by a circumferential groove 42 in the body of shaft 36. A locking pin 44 is mounted in an aperture 45 in the barrel 28 and engages groove 42. This locking pin prevents axial movement between the drive shaft 36 and the reduction barrel 28 while permitting relative rotational movement therebetween. In a similar manner, one end of shaft 26 extends into the bore 40 and has a circumferential groove 46 therein. This groove permits rotation of shaft 26 around locking pin 48 that has been inserted in an aperture 50 in the reduction barrel 28. Locking pin 48 prevents axial movement between shaft 26 and reduction barrel 28 while permitting rotational movement therebeetween.

Normally, this rotational movement between shaft 26 and reduction barrel 28 is permitted only after an excessive resistive force on shaft 26 has been encountered. One example would be when a screw has been fully inserted in its mounting and will not rotate further. When this occurs, a slippage between the drive shaft 36 and drive shaft 26 is desired. Slip clutch spring 52 permits this slippage after a predetermined force has been exceeded. Slip clutch spring 52 urges shaft 26 outwardly from reduction barrel 28 to thereby exert friction between locking pin 48 and the groove 46 on the shaft 26. This causes shaft 26 to rotate with reduction barrel 28, and not relative thereto, until some exterior force prevents rotation of shaft 26 as reduction barrel 28 is rotated. When this occurs, the slip clutch spring does not cause enough friction between the locking pin 48 and the groove 46 of shaft 26 to prevent relative rotation therebetween.

Reference is now made to FIG. 3 and FIG. 4 before proceeding further with the description of the structure of FIG. 2. In FIG. 3 there is shown in perspective the reduction barrel 28 which consists of a cylinder having a spiral lead groove 32 on the periphery thereof. This groove has spaced walls 54, 56 between which that portion of guide pin 30 protrudes that extends from its fixed position in body 16. It thus can be seen that as the reduction barrel 28 is moved longitudinally within the body 16, the guide pin 30 within the groove 32 will cause the reduction barrel 28 to rotate. Apertures 45 and 50 are shown, into which locking pins 44 and 48 are inserted. These pins pass through the walls of bores 38 and 40 into which drive shafts 36 and 26 have been inserted, to thereby prevent their longitudinal displacement. As shown in the sectional view in FIG. 4, pin 30 extends downwardly through the enlarged handle portion 18 of body 16 and into groove 32 between groove walls 54 and 56. Pin 48 passes through the wall of bore 40 in reduction barrel 28, as does pin 44 through the wall of bore 38 shown in FIGURE 2.

Referring back to FIG. 2, shaft 26 terminates in its outer end with a chuck 14 mounted thereon. Chuck 14 is adapted with a press fit to receive shaft 10 having a tip 12 at its end. Shaft 26 and shaft 10 have a tongue 55 and groove 57 connection to prevent rotational slippage therebetween. Shaft 10 is frictionally removable from chuck 14 so that tips of other configurations may be used as desired.

When drive shaft 36 is moved axially, it moves the reduction barrel 28 longitudinally past guide pin 30 which rides in groove 32 of the barrel. This imparts some rotation to the barrel 28 and hence shaft 26. The axial movement of shaft 36 is made by rotation of drive handle 22. As previously stated, reduction drive handle 22 is threadedly mounted on body 16 and its longitudinal movement depends upon the pitch of the threads. The shaft end 58 is an enlargement adapted to fit and engage with the outer end of the reduction drive handle 22. External threads 59 on end 58 mate with those on handle 22. A set screw, or locking pin, 60 additionally causes drive shaft 36 to rotate and to move longitudinally as the reduction drive handle 22 is rotated, with its threaded connection to the body 16, and caused to move longitudinally along the body.

Having thus described one embodiment of the present invention, there are several alternative embodiments that will at once become apparent. For example, the reduction drive handle 22 and drive shaft 36 can be made as one integral piece, if desired. The pitch of the threads connecting the reduction drive handle 22 with body 16 also can vary from coarse to fine depending upon the reduction ratio desired. With a spiral lead groove 32 in reduction barrel 28 having a lead of one revolution per two inches, the reduction ratio of the screwdriver is simply twice that of the pitch of the threads. However, the lead of the spiral groove 32 also may be changed, as desired.

If only one screwdriver tip shape and size is desired, the chuck 14 may be dispensed with, and shaft 10 made simply as an integral extension of shaft 26. If the anti-backlash feature, which includes the slip clutch, is not desired, then the reduction barrel and screwdriver shaft may be made as one integral piece. The embodiment just described, with the friction slip clutch spring 52, has an anti-backlash feature which enables the operator to feel the movement of shaft 26 as it moves tip 12 past a desired point and back again. Thus, making shaft 26 integral with barrel 28 may not have the anti-backlash advantage.

Other modifications and variations will readily occur and all such deviations from the preferred embodiment just described are to be interpreted as part of the present invention as defined by the appended claims.

What is claimed is—

1. A shaft rotation mechanism comprising:
a hollow cylindrical body;
a first shaft extending from one end of said body and adapted to move longitudinally and to rotate relative thereto;
a drive shaft extending from the other end of said body and adapted to rotate and move longitudinally therein;
shaft rotation means within said cylindrical body for rotating said first shaft in response to longitudinal movement of said drive shaft; and
driving means for moving said drive shaft longitudinally within said body
said driving means including a cylindrical member threadedly engageable over said body and longitudinally movable as said member is rotated relative to said body.

2. A shaft rotation mechanism as in claim 1,
said shaft rotation means including a barrel with a spiral lead groove in the surface thereof; and
a pin from said body extending inwardly into said groove to impart rotation to said barrel upon longitudinal movement thereof.

3. A screwdriver comprising:
a hollow cylindrical body;
a reduction barrel within said body adapted to rotate and move longitudinally therein;
a drive shaft connected with and adapted to impart longitudinal movement to said barrel;
said barrel being adapted to rotate upon longitudinal movement within said body;
means for longitudinally moving said drive shaft; and
a screwdriver tip and connecting shaft connected to said barrel for longitudinal movement and rotation therewith;
said means for longitudinally moving said drive sha including a reduction drive handle threadedly er gageable with said body for longitudinal movemer therealong;
said drive shaft being connected to said drive handl and adapted for movement therewith.

4. A screwdriver as in claim 3,
said body having a guide pin protruding inwardly;
said reduction barrel having a lead spiral groove in th wall thereof;
said pin engaging said groove to cause said barrel tc rotate upon longitudinal movement thereof.

5. A screwdriver as in claim 3,
said reduction barrel having a bore in one end thereoi to receive one end of said drive shaft;
said drive shaft having a groove in the surface near the end thereof;
said barrel having an aperture extending through said bore and a locking pin therein;
said locking pin fitting within said groove to prevent longitudinal movement between said barrel and said drive shaft while permitting relative rotation therebetween.

6. A screwdriver as in claim 3,
said barel having a bore in one end thereof to receive a connecting shaft;
said connecting shaft having a groove in the surface near the end thereof;
said barrel having an aperture extending through said bore and a locking pin therein;
said locking pin fitting within said groove to prevent longitudinal movement between said barrel and said connecting shaft; and
a spring within said bore and abutting against said connecting shaft to retard rotational movement thereof relative to said barrel.

References Cited

UNITED STATES PATENTS

| | | | |
|---|---|---|---|
| 2,440,344 | 4/1948 | Montgomery | 74—25 X |
| 2,673,964 | 3/1954 | Morton et al. | 74—57 X |
| 2,818,743 | 1/1958 | Zatsky | 74—57 X |
| 2,933,959 | 4/1960 | McMahon | 81—52.4 |

ROBERT C. RIORDON, *Primary Examiner.*

R. V. PARKER, JR., *Assistant Examiner.*

U.S. Cl. X.R.

74—57